United States Patent
Li et al.

(10) Patent No.: US 10,685,597 B2
(45) Date of Patent: Jun. 16, 2020

(54) EMISSION DRIVING CIRCUIT, DRIVING METHOD OF SHIFT REGISTER, AND DISPLAY DEVICE

(71) Applicant: Shanghai Tianma AM-OLED Co., LTd., Shanghai (CN)

(72) Inventors: Yue Li, Shanghai (CN); Renyuan Zhu, Shanghai (CN); Dongxu Xiang, Shanghai (CN); Yana Gao, Shanghai (CN); Xingyao Zhou, Shanghai (CN); Gaojun Huang, Shanghai (CN); Yilin Xu, Shanghai (CN); Zhonglan Cai, Shanghai (CN); Juan Zhu, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 68 days.

(21) Appl. No.: 16/151,372

(22) Filed: Oct. 4, 2018

(65) Prior Publication Data
US 2019/0295453 A1     Sep. 26, 2019

(30) Foreign Application Priority Data
Mar. 26, 2018   (CN) .......................... 2018 1 0251203

(51) Int. Cl.
G09G 3/3266     (2016.01)
G09G 3/22       (2006.01)
G06F 1/04       (2006.01)

(52) U.S. Cl.
CPC .................. *G09G 3/22* (2013.01); *G06F 1/04* (2013.01); *G09G 2310/0286* (2013.01); *G09G 2310/08* (2013.01)

(58) Field of Classification Search
CPC ......... G09G 2310/0286; G09G 3/3266; G09G 3/3674; G09G 3/3677
See application file for complete search history.

(56) References Cited

U.S. PATENT DOCUMENTS

| 2014/0111092 A1* | 4/2014 | Kim ........................ G09G 5/18 315/127 |
| 2017/0116920 A1* | 4/2017 | Kwon .................. G09G 3/3266 |
| 2018/0090072 A1* | 3/2018 | Sun ...................... G09G 3/3258 |

* cited by examiner

*Primary Examiner* — Yuzhen Shen
(74) *Attorney, Agent, or Firm* — Tarolli, Sundheim, Covell & Tummino LLP

(57) ABSTRACT

Provided is a shift register, including a first node control module for controlling a level state of a first node based on an input signal, a first clock signal and a second clock signal. The shift register includes a second node control module for controlling a level state of a second node based on the input signal, the first clock signal, the second clock signal and the level state of the first node. In a phase when the input signal is at high level and the first clock signal is at low level, a third node for controlling a level at the second node is provided with high level, such that in a phase when the input signal is at high level and the second clock signal is at low level, the level at the third node is pulled down so as to provide low level at the second node.

18 Claims, 7 Drawing Sheets

EMISSION DRIVING CIRCUIT, DRIVING METHOD OF SHIFT REGISTER, AND DISPLAY DEVICE

CROSS-REFERENCE TO RELATED APPLICATIONS

The present application claims priority to Chinese Patent Application No. 201810251203.6, filed on Mar. 26, 2018, the content of which is incorporated herein by reference in its entirety.

TECHNICAL FIELD

The present disclosure relates to display technology, and more particularly, to an emission driving circuit, a driving method of a shift register, and a display device.

BACKGROUND

With the rapid development of the flat panel display technology, an Organic Light Emitting Display (OLED for short) has more and more applications due to its excellent characteristics such as self-luminescence, high brightness, wide viewing angle, and rapid response.

In order to drive an organic light-emitting device in the OLED to emit light, the organic light-emitting display panel includes an emission driving circuit. The emission driving circuit includes a plurality of cascaded shift registers, and the circuit structure of the shift register and the corresponding operating sequence are shown in FIGS. 1 and 2. FIG. 1 is a circuit structure diagram of a shift register provided in the related art, and FIG. 2 is an operating sequence diagram of a shift register provided in the related art.

In view of the current demand for the display effect of the organic light emitting display panel, it is needed to use a dimming mode in driving the organic light emitting device to emit light. In the dimming mode, an input signal provided at an input signal terminal IN is at high level for a longer duration, as compared with the normal display. When the shift register in the related art has a circuit structure as shown in FIG. 1, the input signal is at high level for a longer duration, such that the node N4 of the control node N2 would be suspended for a long time. In this case, the transistor T3 cannot be switched on, the level of the node N2 cannot be effectively controlled, and the shift register cannot operate normally.

SUMMARY

The present disclosure provides an emission driving circuit, a driving method of a shift register, and a display device, aiming to allow the shift register to operate normally in the dimming mode when the input signal is at high level for a longer duration.

In a first aspect of the present disclosure, an emission driving circuit is provided. The emission driving circuit includes a shift register. The shift register includes a first node control module electrically connected to an input signal terminal, a first clock signal terminal, and a second clock signal terminal and configured to control a level state of a first node based on an input signal, a first clock signal and a second clock signal. The shift register also includes a second node control module electrically connected to the input signal terminal, the first clock signal terminal, the second clock signal terminal, a high level signal terminal and the first node and configured to control a level state of a second node based on the input signal, the first clock signal, the second clock signal, a high level signal and the level state of the first node. In a phase when the input signal is at high level and the first clock signal is at low level, a third node for controlling a level at the second node is provided with high level, such that in a phase when the input signal is at high level and the second clock signal is at low level, a level at the third node is pulled down so as to provide low level at the second node. The shift register further includes an output control module electrically connected to the high level signal terminal, a low level signal terminal, the first node and the second node and configured to control an output terminal to output high level or low level based on the level state of the first node and the level state of the second node. The emission driving circuit also includes a first signal line, a second signal line, and a plurality of cascaded shift registers. Each shift register of the plurality of cascaded shift registers is the shift register according to the first aspect of the present disclosure. Shift register at each odd-numbered stage has a first clock signal terminal electrically connected to the first signal line, and a second clock signal terminal electrically connected to the second signal line. Shift register at each even-numbered stage has a first clock signal terminal electrically connected to the second signal line, and a second clock signal terminal electrically connected to the first signal line.

In a second aspect of the present disclosure, a display device is provided. The display device includes the emission driving circuit according to the second aspect of the present disclosure.

In a third aspect of the present disclosure, a driving method of a shift register is provided. The driving method of a shift register is applicable in the shift register according to the first aspect of the present disclosure. The driving method includes:

in a first phase when the input signal is at the low level, the first clock signal is at the high level and the second clock signal is at the low level, providing low level at the first node, providing high level at the second node and outputting low level at the output terminal based on the low level at the first node;

in a second phase when the input signal is at the high level, the first clock signal is at the low level and the second clock signal is at the high level, maintaining the first node at the low level in the first phase, providing the high level at the second node, outputting the low level at the output terminal and providing the high level at the third node based on the low level at the first node;

in a third phase when the input signal is at the high level, the first clock signal is at the high level and the second clock signal is at the low level, providing the high level at the first node, pulling down the level at the third node to provide the low level at the second node and outputting the high level at the output terminal;

in a fourth phase when the input signal is at the low level, the first clock signal is at the low level and the second clock signal is at the high level, maintaining the first node at the high level in the third phase, maintaining the second node at the low level in the third phase, outputting the high level at the output terminal and providing the high level at the third node; and in a fifth phase when the input signal is at the low level, the first clock signal is at the high level and the second clock signal is at the low level, providing the low level at the first node, providing the high level at the second node and outputting the low level at the output terminal based on the low level of the first node.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings without any creative effort.

DESCRIPTION OF EMBODIMENTS

In order to better understand technical solutions of the present disclosure, the embodiments of the present disclosure are described in details with reference to the drawings. It should be clear that the described embodiments are merely part of the embodiments of the present disclosure rather than all of the embodiments. All other embodiments obtained by those skilled in the art without paying creative labor shall fall into the protection scope of the present disclosure.

Figure 3:
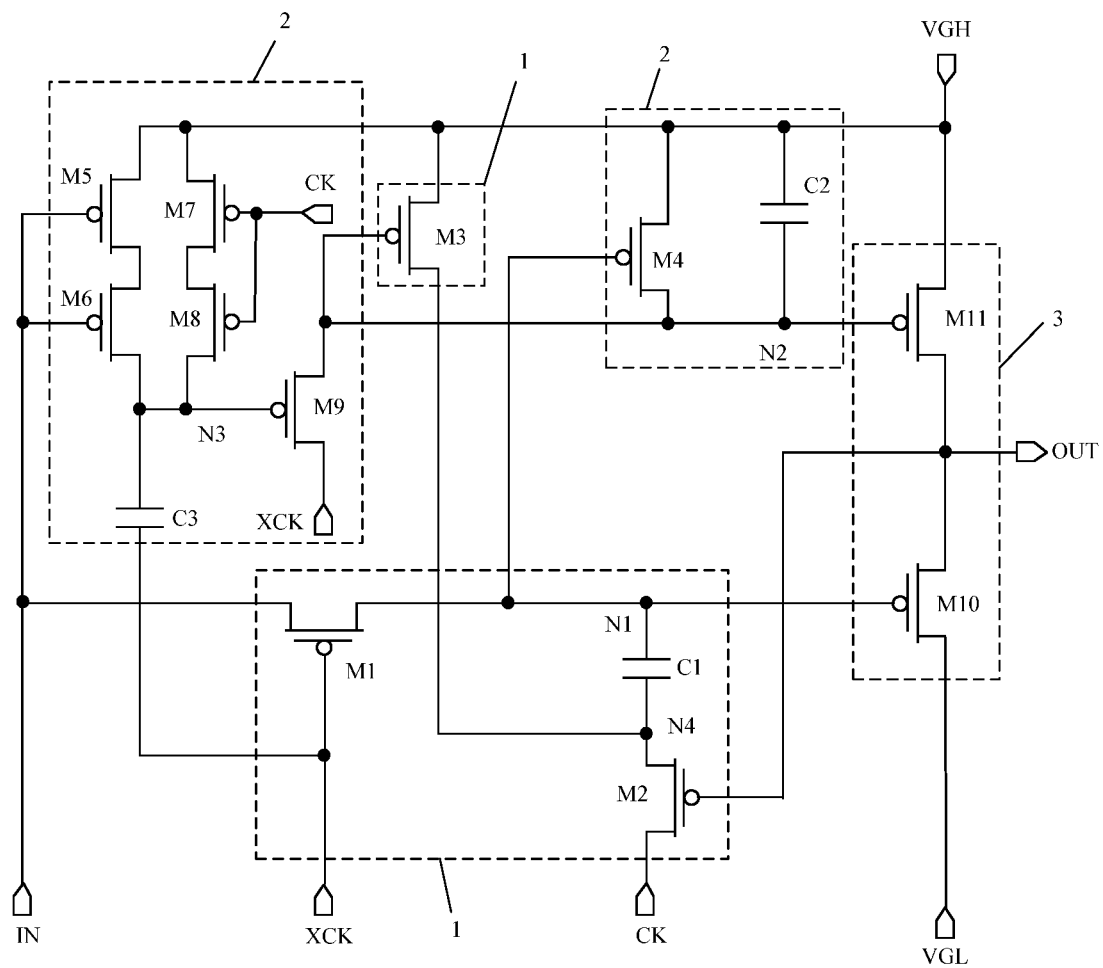
FIG. 3 is a circuit structure diagram of a shift register according to an embodiment of the present disclosure.
Figure 4:
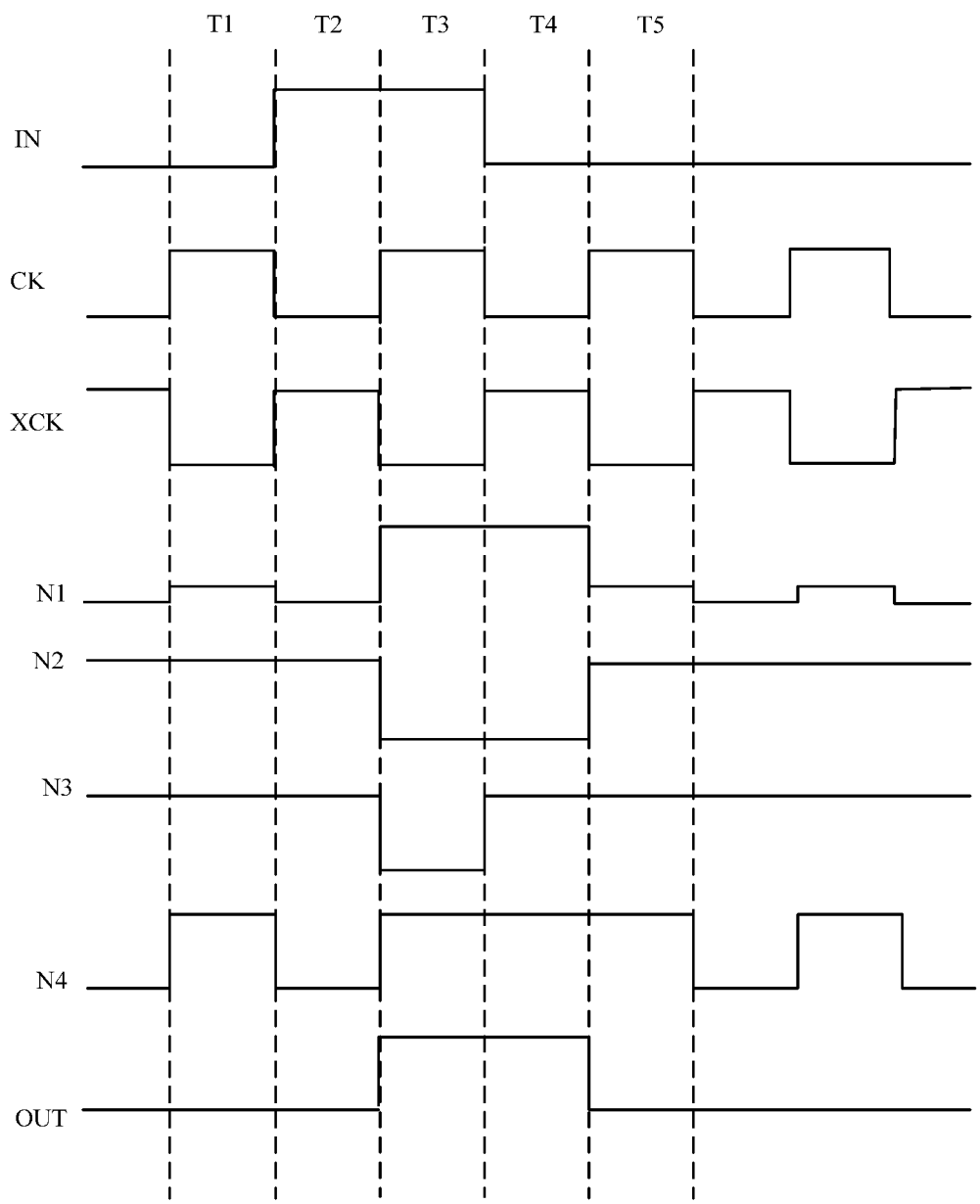
FIG. 4 is an operating sequence diagram of a shift register according to an embodiment of the present disclosure.

According to an embodiment of the present disclosure, a shift register is provided as shown in FIGS. 3 and 4. FIG. 3 is a circuit structure diagram of the shift register according to the embodiment of the present disclosure, and FIG. 4 is an operating sequence diagram of the shift register according to the embodiment of the present disclosure. The shift register includes a first node control module 1, a second node control module 2 and an output control module 3.

The first node control module 1 is electrically connected to an input signal terminal IN, a first clock signal terminal CK, and a second clock signal terminal XCK, and configured to control a level state of a first node N1 based on an input signal, a first clock signal and a second clock signal.

The second node control module 2 is electrically connected to the input signal terminal IN, the first clock signal terminal CK, the second clock signal terminal XCK, a high level signal terminal VGH and the first node N1, and configured to control a level state of a second node N2 based on the input signal, the first clock signal, the second clock signal, a high level signal and the level state of the first node N1. In each phase when the input signal is at high level and the first clock signal is at low level, a third node N3 for controlling a level at the second node N2 is provided with high level, such that in each phase when the input signal is at high level and the second clock signal is at low level, the level at the third node N3 is pulled down so as to provide low level at the second node N2.

The output control module 3 is electrically connected to the high level signal terminal VGH, a low level signal terminal VGL, the first node N1 and the second node N2, and configured to control an output terminal OUT to output high level or low level based on the level state of the first node N1 and the level state of the second node N2.

Figure 1:
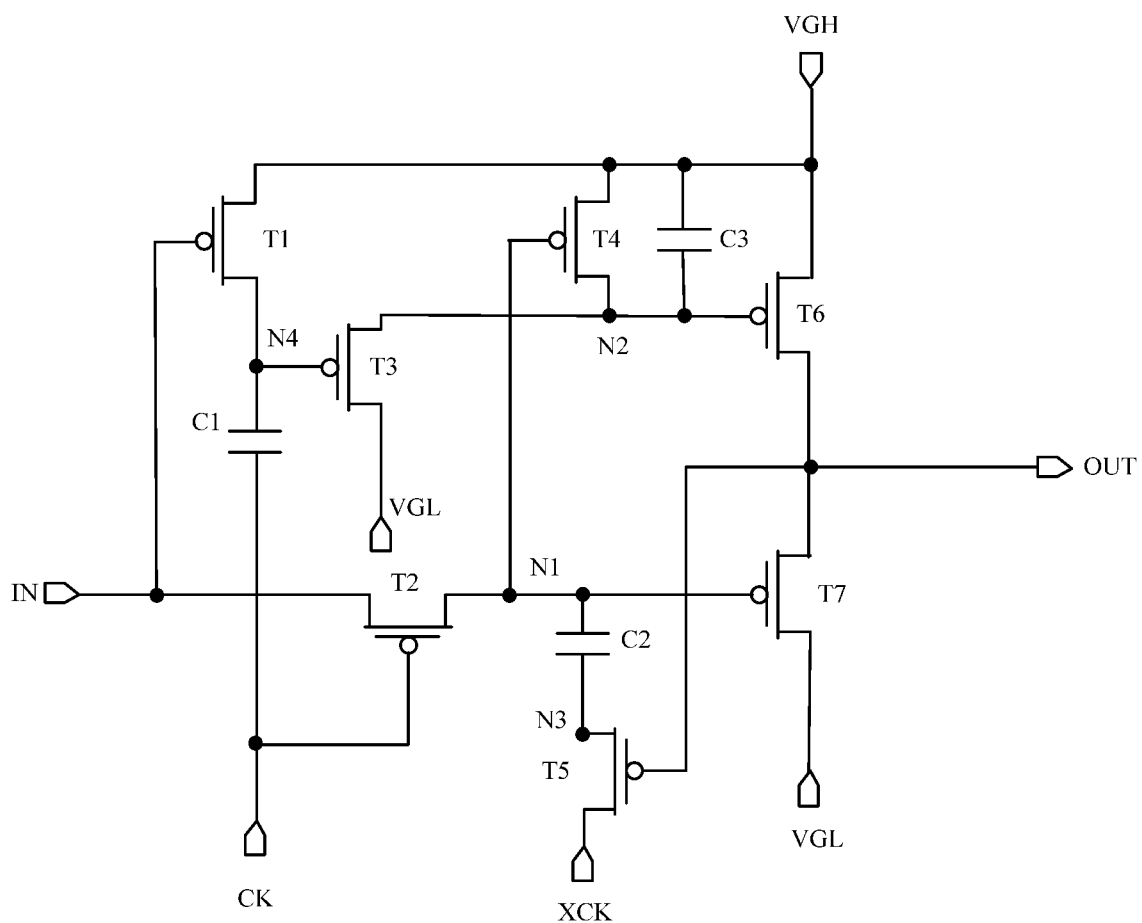
FIG. 1 is a circuit structure diagram of a shift register provided in the related art.
Figure 2:
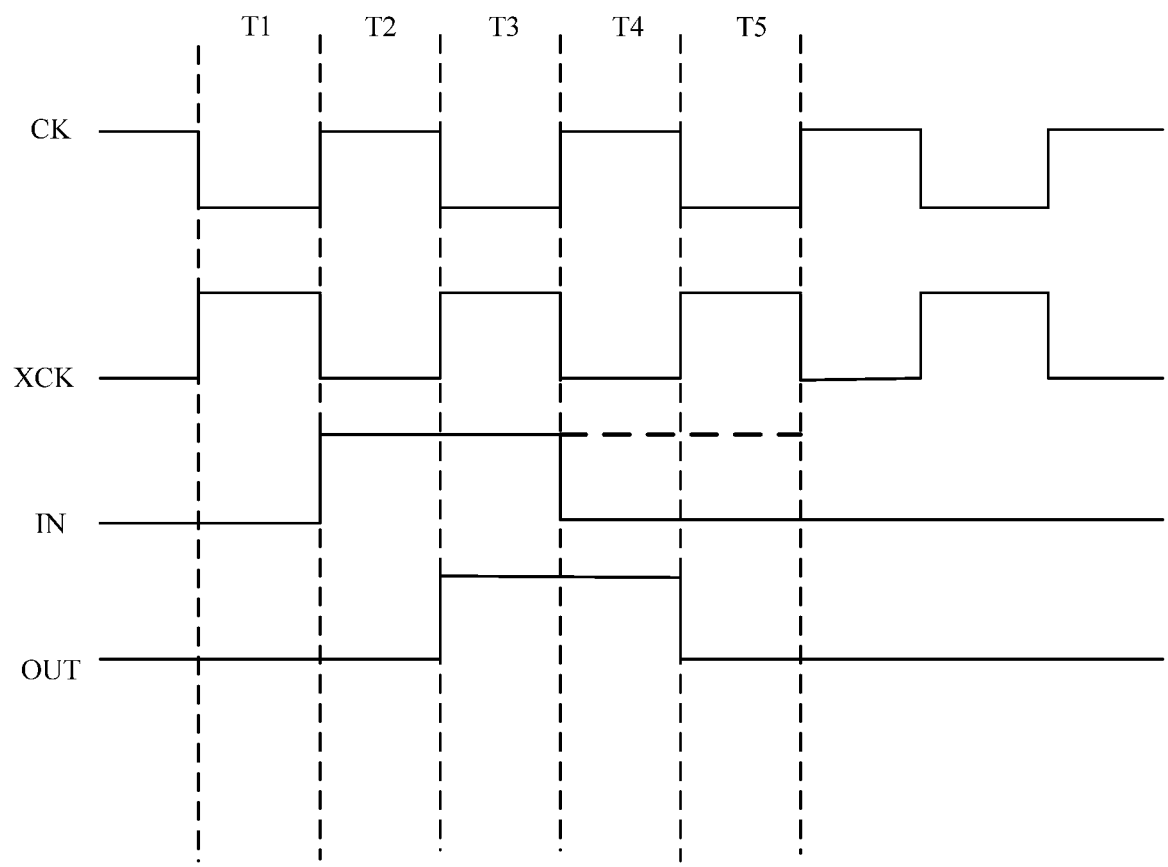
FIG. 2 is an operating sequence diagram of a shift register provided in the related art.

As shown in FIGS. 1 and 2, the operation of the shift register provided in the relate art will be described as follows (the following description mainly focuses on contents related to the present disclosure).

In a first phase T1, the input signal terminal IN provides an input signal at the low level, the first clock signal terminal CK provides a first clock signal at the low level, the second clock signal terminal XCK provides a second clock signal at the high level, the transistor T1 is switched on, and a high level signal provide by the high level signal terminal VGH arrives at the node N4, which is then at the high level.

In a second phase T2, the input signal is at the high level, the first clock signal is at the high level, the second clock signal is at the low level, the transistor T1 is switched off, and the node N4 is suspended. Since the first clock signal changes from the low level in the first phase T1 to the high level, the capacitor C1 leads to a higher level at the node N4.

In a third phase T3, the input signal is at the high level, the first clock signal is at the low level, the second clock signal is at the high level, the transistor T1 is switched off, and the node N4 is suspended. Since the first clock signal changes from the high level in the second phase T2 to the low level, the capacitor C1 pulls down the level at the node N4, such that the node N4 is at the low level.

In a fourth phase T4, when the dimming mode is not adopted, the input signal is at the low level (as illustrated by a solid line in the fourth phase T4 in FIG. 2), the first clock signal is at the high level, the second clock signal is at the low level, the transistor T1 is switched on, and the high level signal provided by the high level signal terminal VGH arrives at the node N4, which is then at the high level; and when the dimming mode is adopted, the input signal is at the high level (as illustrated by dashed line in the fourth phase T4 in FIG. 2), the first clock signal is at the high level, the second clock signal is at the low level, the transistor T1 is switched off, and the node N4 is suspended. Since the first clock signal changes from the low level in the third phase T3 to the high level, the capacitor C1 increases the level at the node N4, such that the node N4 is at the high level.

In a fifth phase T5, when the dimming mode is not adopted, the input signal is at the low level (as illustrated by a solid line in the fifth phase T5 in FIG. 2), the first clock signal is at the low level, the second clock signal is at the high level, the transistor T1 is switched on, and the high level signal provided by the high level signal terminal VGH arrives at the node N4, which is then at the high level; and when the dimming mode is adopted, the input signal is at the high level (as illustrated by a dashed line in the fifth phase T5 in FIG. 2), the first clock signal is at the low level, the second clock signal is at the high level, the transistor T1 is switched off, and the node N4 is suspended. Since the first clock signal changes from the high level in the fourth phase T4 to the low level, the capacitor C1 pulls down the level at the node N4, such that the node N4 is at the low level.

As mentioned above, when the dimming mode is adopted, for the shift register according to the related art, the input signal is at high level for a longer duration, such that the node N4 of the control node N2 is suspended for a long time (for example, the node N4 is suspended for all of the third phase T3, the fourth phase T4, and the fifth phase T5). Then, the transistor T3 cannot be switched on, so that the level of the node N2 cannot be effectively controlled, and the shift register cannot operate normally.

The second node control module 2 according to the embodiment of the present disclosure can provide high level at the third node N3 for controlling the level at the second node N2, in each phase when the input signal is at the high level and the first clock signal is at the low level (e.g., the second phase T2 in FIG. 4). That is, the third node N3 cannot be suspended for a long time, such that in each phase when the input signal is at the high level and the second clock signal is at the low level (e.g., the third phase T3 in FIG. 4), the level at the third node N3 is pulled down so as to provide low level at the second node N2. This can avoid the problem that the level at the second node N2 cannot be effectively controlled. Furthermore, in the case when the dimming mode is adopted and the input signal is at high level for a longer duration, the shift register can operate normally.

To facilitate a better understanding and achieve the beneficial effects of the above shift register, an embodiment of the present disclosure provides a driving method of the shift register. Referring to FIG. 4, the driving method includes:

in a first phase T1 when the input signal provided by the input signal terminal IN is at the low level, the first clock signal provided by the first clock signal terminal CK is at the high level and the second clock signal provided by the second clock signal terminal XCK is at the low level, providing low level at the first node N1, providing high level at the second node N2 and outputting low level at the output terminal OUT based on the low level at the first node N1;

in a second phase T2 when the input signal provided by the input signal terminal IN is at the high level, the first clock signal provided by the first clock signal terminal CK is at the low level and the second clock signal provided by the second clock signal terminal XCK is at the high level, maintaining the first node N1 at the low level in the first phase, providing the high level at the second node N2, outputting the low level at the output terminal OUT and providing the high level at the third node based on the low level at the first node N1;

in a third phase T3 when the input signal provided by the input signal terminal IN is at the high level, the first clock signal provided by the first clock signal terminal CK is at the high level and the second clock signal provided by the second clock signal terminal XCK is at the low level, providing the high level at the first node N1, pulling down the level at the third node N3 to provide the low level at the second node N2 and outputting the high level at the output terminal OUT;

in a fourth phase T4 when the input signal provided by the input signal terminal IN is at the low level, the first clock signal provided by the first clock signal terminal CK is at the low level and the second clock signal provided by the second clock signal terminal XCK is at the high level, maintaining the first node N1 at the high level in the third phase, maintaining the second node N2 at the low state in the third phase, outputting the high level at the output terminal OUT and providing the high level at the third node N3; and in a fifth phase T5 when the input signal provided by the input signal terminal IN is at the low level, the first clock signal provided by the first clock signal terminal CK is at the high level and the second clock signal provided by the second clock signal terminal XCK is at the low level, providing the low level at the first node N1, providing the high level at the second node N2 and outputting the low level at the output terminal OUT based on the low level of the first node N1.

It should be noted that, in the operating time sequence of the shift register as shown in FIG. 4, a duration of the input signal at the input signal terminal IN being at the high level does not corresponds to that when the dimming mode is not adopted. When the dimming mode is adopted, it is only needed to extend the duration of the input signal at the input signal terminal IN being at the high level, in combination with the above contents.

Figure 5:
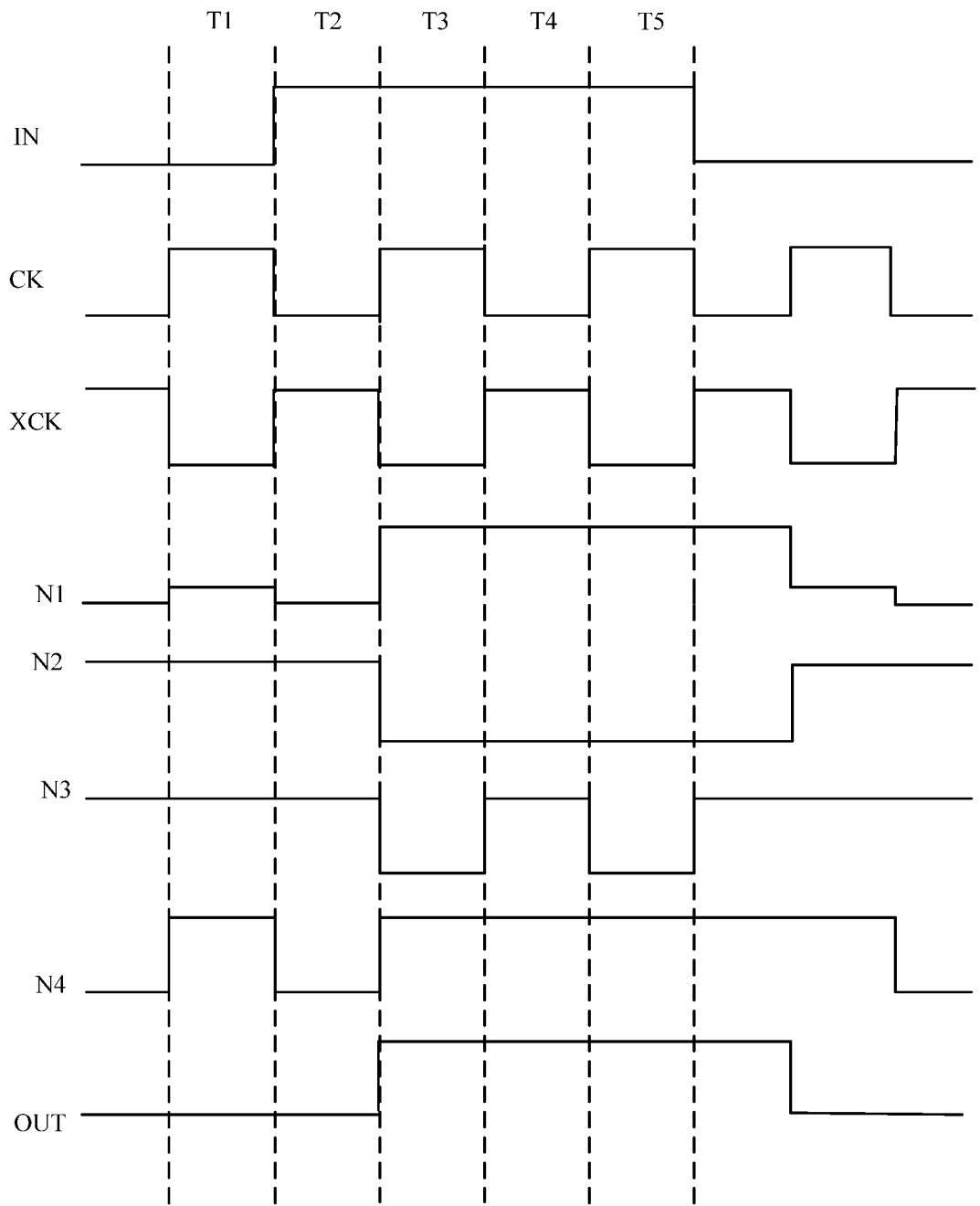
FIG. 5 is another operating sequence diagram of a shift register according to an embodiment of the present disclosure.

For example, FIG. 5 is another operating sequence diagram of a shift register according to an embodiment of the present disclosure. As shown in FIG. 5, the duration of the input signal being at the high level is extended to the end of the fifth phase T5, and thus the operation of the shift register does not change in the first phase T1, the second phase T2 and the third phase T3.

In the fourth phase T4, the input signal is at the high level, the first clock signal is at the low level, and the second clock signal is at the high level. The fifth transistor M5 and the sixth transistor M6 under control of the input signal are both switched off. The seventh transistor M7 and the eighth transistor M8 under control of the first clock signal are both switched on. The high level signal provided by the high level signal terminal VGH arrives at the third node N3, which is then at the high level. The ninth transistor M9 is switched off. The first transistor M1 under control of the second clock signal is switched off. The first capacitor C1 maintains the first node N1 at the high level in the third phase T3. The fourth transistor M4 is switched off. The tenth transistor M10 is switched off. The second capacitor C2 maintains the second mode N2 at the low level in the third phase T3. The third transistor M3 is switched on. The high level signal provided by the high level signal terminal VGH arrives at the fourth node N4, which is then at the high level. The second node N2 makes the eleventh transistor M11 be switched on. The high level signal provided by the high level signal terminal VGH arrives at the output terminal OUT, which then outputs high level. The second transistor M2 is switched off.

In the fifth phase T5, the input signal is at the high level, the first clock signal is at the high level, and the second clock signal is at the low level. The fifth transistor M5 and the sixth transistor M6 under control of the input signal are both switched off. The seventh transistor M7 and the eighth transistor M8 under control of the first clock signal are both switched off. Since the second clock signal changes from the high level in the fourth phase to the low level, the third capacitor C3 pulls down the level at the third node N3, which is then at the low level. The ninth transistor M9 is switched on. The second clock signal arrives at the second node N2, which is at the low level. The third transistor M3 is switched on. The high level signal provided by the high level signal terminal VGH arrives at the fourth node N4, which is then at the high level. The second node N2 makes the eleventh transistor M11 be switched on. The high level signal provided by the high level signal terminal VGH arrives at the output terminal OUT, which then outputs high level. The second transistor M2 is switched off. The first transistor M1 under control of the second clock signal is switched on. The input signal arrives at the first node N1, which is then at the high level. The fourth transistor M4 is switched off. The tenth transistor M10 is switched off.

Since the third node N3 is provided with high level in the fourth phase T4, the third node N3 would not be suspended, such that in the fifth phase T5, it is impossible that the ninth transistor M9 cannot be switched on. Thereby, the level at the second node N2 can be effectively controlled.

In the following description, the specific functions and optionally the specific circuit structures of the first node control module 1, the second node control module 2 and the output control module 3 of the shift register will be explained with reference to FIGS. 3 and 4. It should be noted that the following description is also applicable to the shift register and its driving method according to the embodiments of the present disclosure.

As a first aspect, the first node control module 1 is configured to provide high level at the first node N1 when the first clock signal is at high level, the second clock signal is at low level and the input signal is at high level, and to provide low level at the first node N1 when the first clock signal is at high level, the second clock signal is at low level and the input signal is at low level; and is also configured to maintain the first node N1 at the high level in the previous phase when the first clock signal is at the low level, the second clock signal is at the high level and the input signal is at the low level, and to maintain the first node N1 at the low level in the previous phase when the first clock signal is at the low level, the second clock signal is at the high level and the input signal is at the high level.

In conjunction with FIG. 4, in the first phase T1 when the first clock signal is at the high level, the second clock signal is at the low level and the input signal is at the low level, the first node control module 1 provides low level at the first node N1; in the second phase T2 when the first clock signal is at the low level, the second clock signal is at the high level and the input signal is at the high level, the first node control module 1 maintains the first node N1 at the low level in the first phase; in the third phase T3 when the first clock signal is at the high level, the second clock signal is at the low level and the input signal is at the high level, the first node control module 1 provides the high level at the first node N1; in the fourth phase T4 when the first clock signal is at the low level, the second clock signal is at the high level and the input signal is at the low level, the first node control module 1 maintains the first node N1 at the high level in the third phase; and in the fifth phase T5 when the first clock signal is at the high level, the second clock signal is at the low level and the input signal is at the low level, the first node control module 1 provides the low level at the first node N1.

In an embodiment, the first node control module 1 is further electrically connected to the output terminal OUT and configured to provide the low level at the first node N1 when the first clock signal is at the low level, the second clock signal is at the high level and the output terminal OUT provides the low level, and maintain the first node N1 at the high level in the previous phase when the first clock signal is at the low level, the second clock signal is at the high level and the output terminal OUT provides the high level.

In an embodiment, as shown in FIG. 3, the first node control module 1 includes a first transistor M1, a second transistor M2 and a first capacitor C1. The first transistor M1 has a control terminal electrically connected to the second clock signal terminal XCK, a first terminal electrically connected to the input signal terminal IN, and a second terminal electrically connected to the first node N1. The second transistor M2 has a control terminal electrically connected to the output terminal OUT, a first terminal electrically connected to the first clock signal terminal CK, and a second terminal electrically connected to a fourth node N4. The first capacitor C1 has a first terminal electrically connected to the fourth node N4 and a second terminal electrically connected to the first node N1.

With such connection relations between the second transistor M2 and the first capacitor C1, the level at the fourth node N4 can be controlled by the output terminal OUT of the shift register and further the level at the first node N1 can be influenced by the first capacitor C1. This can compensate a threshold drift of the tenth transistor M10 and ensure the accuracy of the output signal at the output terminal OUT of the shift register. Moreover, at the moment of switching between high level and low level at the output terminal OUT of the shift register, a signal outputted by the output terminal OUT of the shift register can have no influence on levels at the first node N1 and the second node N2, thereby leading to no competition and thus enhancing the stability of the shift register.

According to the embodiment of the present disclosure, each of the first transistor M1, the second transistor M2 and the third transistor M3 can be a PMOS transistor, which is switched on when its control terminal is at low level and switched off when the control terminal is at high level. Unless otherwise specified, the transistors mentioned in the following embodiments of the present disclosure are all PMOS transistors. In addition, when the first node control module 1 has the above structure, specific operating states of the first transistor M1, the second transistor M2, the third transistor M3 and the first capacitor C1 in respective operating phase of the shift register will be described in detail in the following descriptions.

Further, the first node control module 1 further incudes the third transistor M3. The third transistor M3 has a control terminal electrically connected to the second node N2, a first terminal electrically connected to the high level signal terminal VGH and a second terminal electrically connected to the fourth node N4. In the third phase T3 and the fourth phase T4, the third transistor M3 is switched on under control of the low level at the second node N2, and transmits the high level signal provided by the high level signal terminal VGH to the fourth node N4, thereby avoiding the fourth node N4 being in suspension. Meanwhile, the first node N1 is maintained at the high level by means of coupling effect of the first capacitor C1, such that there is no competition between two terminals of the output terminal OUT and thus the shift register can output stably.

In a second aspect, the second node control module 2 is configured to provide high level at the second node N2 based on the low level at the first node N1; pull down the level at the third node N3 and provide the low level at the second node N2 when the first node N1 is at the high level, the input signal is at the high level, the first clock signal is at the high level and the second clock signal is at the low level; maintain the second node N2 at the low level in the previous phase when the first node N1 is at the high level, the input signal is at the low level, the first clock signal is at the low level and the second clock signal is at the high level, and provide the high level at the third node N3 based on the low level of the first clock signal and the high level of the second clock signal.

Referring to FIG. 4, in the first phase T1, the second node control module 2 provides high level at the second node N2 based on the low level at the first node N1; in the second phase T2, the second node control module 2 still provides high level at the second node N2 based on the low level at the first node N1, and provides high level at the third node N3 based on the low level of the first clock signal and the high level of the second clock signal; in the third phase T3, the second node control module 2 pulls down the level at the third node N3 and provides low level at the second node N2, based on the high level at the first node N1, the high level of the input signal, the high level of the first clock signal and the low level of the second clock signal; in the fourth phase T4, the second node control module 2 maintains the second node N2 at the low level in the third phase based on the high level at the first node N1, the low level of the input signal, the low level of the first clock signal and the high level of the second clock signal, and provides high level at the third node N3 based on the low level of the first clock signal and the high level of the second clock signal; and in the fifth phase T5, the second node control module 2 provides high level at the second node N2 based on the low level at the first node N1.

In an embodiment, as shown in FIG. 3, the second node control module 2 includes a fourth transistor M4, a fifth transistor M5, a sixth transistor M6, a seventh transistor M7, an eighth transistor M8, a ninth transistor M9, a second capacitor C2 and a third capacitor C3.

The fourth transistor M4 has a control terminal electrically connected to the first node N1, a first terminal electrically connected to the high level signal terminal VGH, and a second terminal electrically connected to the second node N2.

The second capacitor C2 has a first terminal electrically connected to the high level signal terminal VGH and a second terminal electrically connected to the second node N2.

A control terminal of the fifth transistor M5 and a control terminal of the sixth transistor M6 are electrically connected to the input signal terminal IN. A first terminal of fifth transistor M5 is electrically connected to the high level signal terminal VGH and a second terminal of fifth transistor M5 is electrically connected to a first terminal of the sixth transistor M6. A second terminal of the sixth transistor M6 is electrically connected to the third node N3.

A control terminal of the seventh transistor M7 and a control terminal of the eighth transistor M8 are electrically connected to the first clock signal terminal CK. A first terminal of the seventh transistor M7 is electrically connected to the high level signal terminal VGH and a second terminal of the seventh transistor M7 is electrically connected to a first terminal of the eighth transistor M8. TA second terminal of the eighth transistor M8 is electrically connected to the third node N3.

The ninth transistor M9 has a control terminal electrically connected to the third node N3, a first terminal electrically connected to the second clock signal terminal XCK and a second terminal electrically connected to the second node N2.

The third capacitor C3 has a first terminal electrically connected to the second clock signal terminal XCK and a second terminal electrically connected to the third node N3.

The connection relations between the fifth transistor M5 and the sixth transistor M6 can effectively reduce leakage current through these two transistors, which can facilitate maintaining the level stability at the third node N3. Similarly, the connection relations between the seventh transistor M7 and the eighth transistor M8 also can effectively reduce leakage current through these two transistors, which can facilitate maintaining the level stability at the third node N3.

When the second node control module 2 has the above structure, specific operating states of the fourth transistor M4, the fifth transistor M5, the sixth transistor M6, the seventh transistor M7, the eighth transistor M8, the ninth transistor M9, the second capacitor C2 and the third capacitor C3 in respective operating phase of the shift register will be described in detail in the following descriptions.

In a third aspect, the output control module 3 is configured to control the output terminal OUT to output high level when the first node N1 is at the high level and the second node N2 is at the low level, and control the output terminal OUT to output low level when the first node N1 is at the low level and the second node N2 is at the high level.

Referring to FIG. 4, in the first phase T1, the first node N1 is at the low level, the second node N2 is at the high level, and the output terminal OUT outputs low level; in the second phase T2, the first node N1 is still at the low level, the second node N2 is still at the high level, and the output terminal OUT still outputs low level; in the third phase T3, the first node N1 is at the high level, the second node N2 is at the low level, and the output terminal OUT outputs high level; in the fourth phase T4, the first node N1 is still at the high level, the second node N2 is still at the low level, and the output terminal OUT still outputs high level; and in the fifth phase T5, the first node N1 is still at the low level, the second node N2 is at the high level, and the output terminal OUT outputs low level.

In an embodiment, the output control module 3 includes a tenth transistor M10 and an eleventh transistor M11.

The tenth transistor M10 has a control terminal electrically connected to the first node N1, a first terminal electrically connected to the low level signal terminal VGL and a second terminal electrically connected to the output terminal OUT.

The eleventh transistor M11 has a control terminal electrically connected to the second node N2, a first terminal electrically connected to the high level signal terminal VGH and a second terminal electrically connected to the output terminal OUT.

When the output control module 3 has the above structure, specific operating states of the tenth transistor M10 and the eleventh transistor M11 in respective operating phase of the shift register will be described in detail in the following descriptions.

In the following, by taking a shift register having the circuit structure shown in FIG. 3 as an example, specific operating states of the first transistor M1 to the eleventh transistor M11 and the first capacitor C1 to the third capacitor C3 will be explained in detail with reference to the operating sequence diagram shown in FIG. 4.

In the first phase T1, the input signal provided by the input signal terminal IN is at the low level, the first clock signal provided by the first clock signal terminal CK is at the high level and the second clock signal provided by the second clock signal terminal XCK is at the low level. The fifth transistor M5 and the sixth transistor M6 under control of the input signal are both switched on. The seventh transistor M7 and the eighth transistor M8 under control of the first clock signal are both switched off. The high level signal provided by the high level signal terminal VGH arrives at the third node N3 through the fifth transistor M5 and the sixth transistor M6. The third node N3 is then at the high level. The ninth transistor M9 is switched off. The first transistor M1 under control of the second clock signal is switched on. The input signal arrives at the first node N1, which is then at the low level. The fourth transistor M4 is switched on. The tenth transistor M10 is switched on. The low level signal provided by the low level signal terminal VGL arrives at the output terminal OUT through the tenth transistor M10. The output terminal OUT outputs the low level. The high level signal provided by the high level signal terminal VGH arrives at the second node N2 through the fourth transistor M4, and the second node N2 is then at the high level. The third transistor M3 is switched off. Since the output terminal OUT outputs the low level, the second transistor M2 is switched on. The first clock signal arrives at the fourth node N4, which is then at the high level.

In the second phase T2, the input signal provided by the input signal terminal IN is at the high level, the first clock signal provided by the first clock signal terminal CK is at the low level and the second clock signal provided by the second clock signal terminal XCK is at the high level. The fifth transistor M5 and the sixth transistor M6 under control of the input signal are both switched off. The seventh transistor M7 and the eighth transistor M8 under control of the first clock signal are both switched on. The high level signal provided by the high level signal terminal VGH arrives at the third node N3 through the seventh transistor M7 and the eighth transistor M8. The third node N3 is then at the high level. The ninth transistor M9 is switched off. The first transistor M1 under control of the second clock signal is switched off. The first capacitor C1 maintains the first node N1 at the low level and makes the level at the first node N1 lower. The fourth transistor M4 is switched on. The tenth transistor M10 is switched on. The low level signal provided by the low level signal terminal VGL arrives at the output terminal OUT through the tenth transistor M10. The output terminal OUT outputs the low level. The high level signal provided by the high level signal terminal VGH arrives at the second node N2 through the fourth transistor M4, and the second node N2 is then at the high level. The third transistor M3 is switched off. Since the output terminal OUT outputs the low level, the second transistor M2 is switched on. The first clock signal arrives at the fourth node N4, which is then at the low level.

In the third phase T3, the input signal provided by the input signal terminal IN is at the high level, the first clock signal provided by the first clock signal terminal CK is at the high level and the second clock signal provided by the second clock signal terminal XCK is at the low level. The fifth transistor M5 and the sixth transistor M6 under control of the input signal are both switched off. The seventh transistor M7 and the eighth transistor M8 under control of the first clock signal are both switched off. The second clock signal changes from the high level in the second phase to the low level. The level at the third node N3 is pulled down by the third capacitor C3, such that the third node N3 is at the low level. The ninth transistor M9 is switched on. The second cock signal arrives at the second node N2 through the ninth transistor M9. The second node N2 is at the low level. The third transistor M3 is switched on. The eleventh transistor M11 is switched on. The high level signal provided by the high level signal terminal VGH arrives at the output terminal OUT through the eleventh transistor M11. The output terminal OUT outputs high level. The high level signal provided by the high level signal terminal VGH arrives at the fourth node N4 through the third transistor M3, and the fourth node N4 is then at the high level. The first transistor M1 under control of the second clock signal is switched on. The input signal arrives at the first node N1, which is then at the high level. The fourth transistor M4 is switched off. The tenth transistor M10 is switched off. The output terminal OUT outputs high level. The second transistor M2 is switched off.

In the fourth phase T4, the input signal provided by the input signal terminal IN is at the low level, the first clock signal provided by the first clock signal terminal CK is at the low level and the second clock signal provided by the second clock signal terminal XCK is at the high level. The fifth transistor M5 and the sixth transistor M6 under control of the input signal are both switched on. The seventh transistor M7 and the eighth transistor M8 under control of the first clock signal are both switched on. The high level signal provided by the high level signal terminal VGH arrives at the third node N3, which is then at the high level. The ninth transistor M9 is switched off. The first transistor M1 under control of the second clock signal is switched off. The first capacitor C1 maintains the first node N1 at the high level in the third phase. The fourth transistor M4 is switched off. The tenth transistor is switched off. The second capacitor C2 maintains the second node N2 at the low level. The third transistor M3 is switched on. The high level signal provided by the high level signal terminal VGH arrives at the fourth node N4, which is then at the high level. The eleventh transistor M11 is switched on. The high level signal provided by the high level signal terminal VGH arrives at the output terminal OUT, which then outputs high level. Since the output terminal OUT outputs the high level, the second transistor M2 is switched off.

In the fifth phase T5, the input signal provided by the input signal terminal IN is at the low level, the first clock signal provided by the first clock signal terminal CK is at the high level and the second clock signal provided by the second clock signal terminal XCK is at the low level. The fifth transistor M5 and the sixth transistor M6 under control of the input signal are both switched on. The seventh transistor M7 and the eighth transistor M8 under control of the first clock signal are both switched off. The high level signal provided by the high level signal terminal VGH arrives at the third node N3 through the fifth transistor M5 and the sixth transistor M6. The third node N3 is then at the high level. The ninth transistor M9 is switched off. The first transistor M1 under control of the second clock signal is switched on. The input signal arrives at the first node N1, which is then at the low level. The fourth transistor M4 is switched on. The tenth transistor M10 is switched on. The low level signal provided by the low level signal terminal VGL arrives at the output terminal OUT through the tenth transistor M10. The output terminal OUT then outputs low level. The high level signal provided by the high level signal terminal VGH arrives at the second node N2 through the fourth transistor M4, and the second node N2 is then at the high level. The third transistor M3 is switched off. Since the output terminal OUT outputs the low level, the second transistor M2 is switched on. The first clock signal arrives at the fourth node N4, which is then at the high level.

Figure 6:
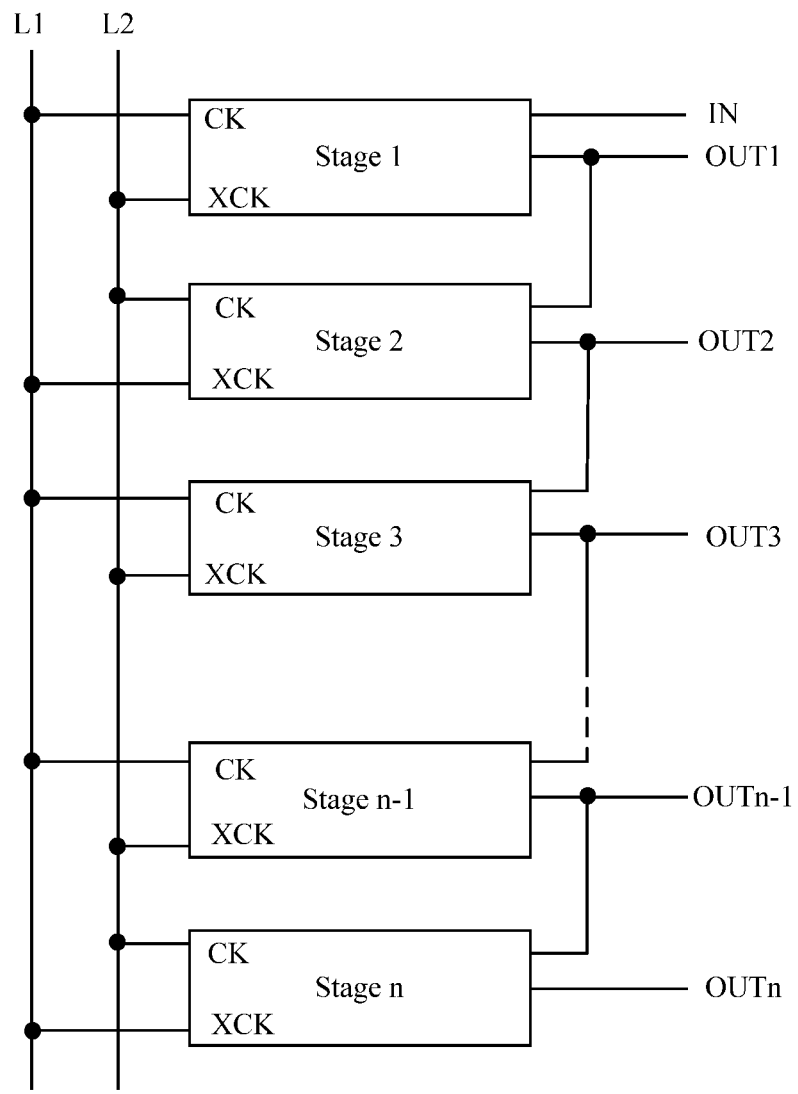
FIG. 6 is a schematic diagram of an emission driving circuit according to an embodiment of the present disclosure.

The embodiments of the present disclosure further provide an emission driving circuit, as shown in FIG. 6. FIG. 6 is a schematic diagram of an emission driving circuit according to an embodiment of the present disclosure. The emission driving circuit includes a first signal line L1, a second signal line L2, and a plurality of cascaded shift registers (denoted as Stage 1, Stage 2, . . . in FIG. 6). Each stage of shift register can be any shift register mentioned above.

Shift register at each odd-numbered stage has a first clock signal terminal CK electrically connected to the first signal line L1, and a second clock signal terminal XCK electrically connected to the second signal line L2.

Shift register at even-numbered stage has a first clock signal terminal CK electrically connected to the second signal line L2, and a second clock signal terminal XCK electrically connected to the first signal line L1.

Further, as illustrated in FIG. 6, a $n^{th}$ stage of shift register of the cascaded shift registers has an input signal terminal IN electrically connected to an output terminal OUT (n−1) of a $(n-1)^{th}$ stage of shift register, where n is 2, 3, 4, . . . , or N, and N is a number of shift registers in the emission driving circuit. The input signal terminal IN of the first stage of shift register can be either individually connected to the input signal line, or connected to the output terminal OUT of the $N^{th}$ stage of shift register, which is not limited in the embodiments of the present disclosure.

Figure 7:
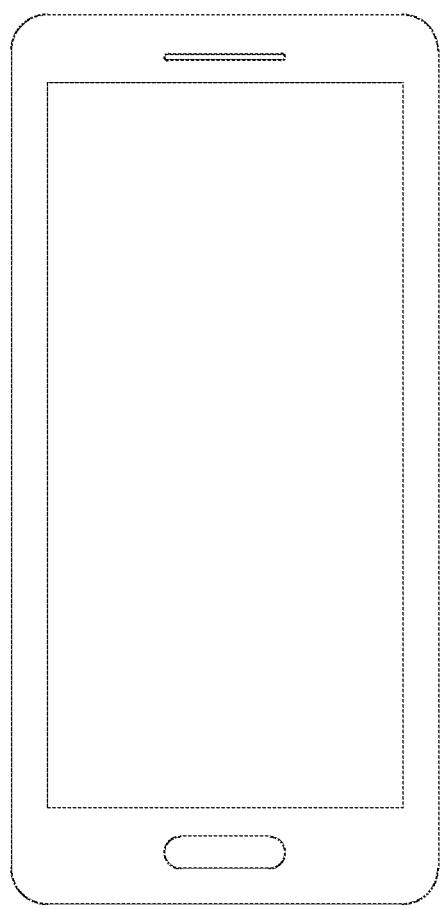
FIG. 7 is a top view of a display device according to an embodiment of the present disclosure.

The embodiments of the present disclosure further provide a display device as shown in FIG. 7. FIG. 7 is a top view of a display device according to an embodiment of the present disclosure. The display device includes the emission driving circuit as mentioned above. The display device according to the embodiments of the present disclosure can be any product or component having display function such as a smart phone, a wearable smart watch, intelligent glasses, a Tablet PC, a TV, a monitor, a laptop, a digital photo frame, a navigator, a car monitor, an e-book, and the like. The display panel and the display device provided in the embodiments of the present disclosure can be either flexible or non-flexible, which is not limited herein.

In an embodiment, the display device can be an organic light emitting display device including an organic light emitting display panel. The organic light emitting display panel includes a plurality of pixel circuits and a plurality of organic light-emitting diodes disposed on the display panel. Each organic light emitting diode has an anode electrically connected to a corresponding pixel circuit. The plurality of light emitting diodes includes a light emitting diode for emitting red light, a light emitting diode for emitting green light, and a light emitting diode for emitting blue light. In addition, the organic light emitting display panel further includes an encapsulation layer covering the plurality of organic light emitting diodes.

The embodiments of the present disclosure provide a shift register and a driving method of the shift register, an emission driving circuit, and a display device. The shift register includes a first node control module, a second node control module, and an output control module. The first node control module is configured to control a level state of a first node based on an input signal, a first clock signal and a second clock signal. The second node control module is configured to control a level state of a second node based on the input signal, the first clock signal, the second clock signal and the level state of the first node. In each phase when the input signal is at high level and the first clock signal is at low level, a third node for controlling a level at the second node is provided with high level, such that in each phase when the input signal is at the high level and the second clock signal is at the low level, the level at the third node is pulled down so as to provide low level at the second node. The output control module is configured to control an output terminal to output high level or low level based on the level state of the first node and the level state of the second node. In each phase when the input signal is at the high level and the first clock signal is at the low level, the second node control module of the shift register can provide high level at the third node for controlling the level at the second node. That is, the third node cannot be in suspension for a long time, such that in each phase when the input signal is at the high level and the second clock signal is at the low level, the level at the third node is pulled down so as to provide low level at the second node. This can avoid the problem that the level at the second node cannot be effectively controlled. Furthermore, in the case when the dimming mode is adopted and the input signal is at high level for a longer duration, the shift register can operate normally Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. An emission driving circuit, comprising a shift register, wherein the shift register comprises:
   a first node control module electrically connected to an input signal terminal, a first clock signal terminal, and a second clock signal terminal and configured to control a level state of a first node based on an input signal, a first clock signal and a second clock signal;
   a second node control module electrically connected to the input signal terminal, the first clock signal terminal, the second clock signal terminal, a high level signal terminal and the first node and configured to control a level state of a second node based on the input signal, the first clock signal, the second clock signal, a high level signal and the level state of the first node, wherein in a phase when the input signal is at a high level and the first clock signal is at a low level, a third node for controlling the level at the second node is provided with a high level, such that in a phase when the input signal is at a high level and the second clock signal is at a low level, the level at the third node is pulled down so as to provide a low level at the second node; and
   an output control module electrically connected to the high level signal terminal, a low level signal terminal, the first node and the second node and configured to control an output terminal to output a high level or a low level based on the level state of the first node and the level state of the second node.

2. The emission driving circuit according to claim 1, wherein the first node control module is configured to:
   provide high level at the first node when the first clock signal is at high level, the second clock signal is at low level and the input signal is at high level, and provide low level at the first node when the first clock signal is at high level, the second clock signal is at low level and the input signal is at low level; and
   maintain the first node at the high level when the first clock signal is at the low level, the second clock signal is at the high level and the input signal is at the low level, and maintain the first node at the low level when the first clock signal is at the low level, the second clock signal is at the high level and the input signal is at the high level.

3. The emission driving circuit according to claim 2, wherein the first node control module is electrically connected to the output terminal and configured to:
   provide low level at the first node when the first clock signal is at the low level, the second clock signal is at the high level and the output terminal provides the low level, and
   maintain the first node at the high level when the first clock signal is at the low level, the second clock signal is at the high level and the output terminal provides the high level.

4. The emission driving circuit according to claim 3,
   wherein the first node control module comprises a first transistor, a second transistor and a first capacitor,
   wherein the first transistor has a control terminal electrically connected to the second clock signal terminal, a first terminal electrically connected to the input signal terminal, and a second terminal electrically connected to the first node,
   wherein the second transistor has a control terminal electrically connected to the output terminal, a first terminal electrically connected to the first clock signal terminal, and a second terminal electrically connected to a fourth node, and wherein the first capacitor has a first terminal electrically connected to the fourth node and a second terminal electrically connected to the first node.

5. The emission driving circuit according to claim 4, wherein the first node control module further comprises a third transistor, the third transistor having a control terminal electrically connected to the second node, a first terminal electrically connected to the high level signal terminal and a second terminal electrically connected to the fourth node.

6. The emission driving circuit according to claim 1, wherein the second node control module is configured to:
provide high level at the second node when the first node is at the low level;
pull down the level at the third node and provide low level at the second node when the first node is at the high level, the input signal is at the high level, the first clock signal is at the high level and the second clock signal is at the low level;
maintain the second node at the low level when the first node is at the high level, the input signal is at the low level, the first clock signal is at the low level and the second clock signal is at the high level; and
provide high level at the third node when the first clock signal is at the low level and the second clock signal is at the high level.

7. The emission driving circuit according to claim 6, wherein the second node control module comprises a fourth transistor, a fifth transistor, a sixth transistor, a seventh transistor, an eighth transistor, a ninth transistor, a second capacitor and a third capacitor,
wherein the fourth transistor has a control terminal electrically connected to the first node, a first terminal electrically connected to the high level signal terminal, and a second terminal electrically connected to the second node,
wherein both the second capacitor has a first terminal electrically connected to the high level signal terminal and a second terminal electrically connected to the second node,
wherein both a control terminal of the fifth transistor and a control terminal of the sixth transistor are electrically connected to the input signal terminal, a first terminal of the fifth transistor is electrically connected to the high level signal terminal, a second terminal of the fifth transistor is electrically connected to a first terminal of the sixth transistor, and a second terminal of the sixth transistor is electrically connected to the third node,
wherein a control terminal of the seventh transistor and a control terminal of the eighth transistor are electrically connected to the first clock signal terminal, a first terminal of the seventh transistor is electrically connected to the high level signal terminal, a second terminal of the seventh transistor is electrically connected to a first terminal of the eighth transistor, and a second terminal of the eighth transistor is electrically connected to the third node,
wherein the ninth transistor has a control terminal electrically connected to the third node, a first terminal electrically connected to the second clock signal terminal and a second terminal electrically connected to the second node, and
wherein the third capacitor has a first terminal electrically connected to the second clock signal terminal and a second terminal electrically connected to the third node.

8. The emission driving circuit according to claim 1, wherein the output control module is configured to:

control the output terminal to output high level when the first node is at the high level and the second node is at the low level, and
control the output terminal to output low level when the first node is at the low level and the second node is at the high level.

9. The emission driving circuit according to claim 8, wherein the output control module comprises a tenth transistor and an eleventh transistor,
wherein the tenth transistor has a control terminal electrically connected to the first node, a first terminal electrically connected to the low level signal terminal and a second terminal electrically connected to the output terminal, and
wherein the eleventh transistor has a control terminal electrically connected to the second node, a first terminal electrically connected to the high level signal terminal and a second terminal electrically connected to the output terminal.

10. The emission driving circuit according to claim 1, comprising a first signal line, a second signal line, and a plurality of cascaded shift registers, each shift register of which is shown according to claim 1,
wherein a shift register at each odd-numbered stage has a respective first clock signal terminal electrically connected to the first signal line, and a respective second clock signal terminal electrically connected to the second signal line, and
wherein a shift register at each even-numbered stage has a respective first clock signal terminal electrically connected to the second signal line, and a respective second clock signal terminal electrically connected to the first signal line.

11. The emission driving circuit according to claim 10, wherein a $n^{th}$ stage of shift register of the plurality of cascaded shift registers has a respective input signal terminal electrically connected to an output terminal of a $(n-1)^{th}$ stage of the plurality of cascaded shift registers, and wherein n is from 2 to N, N being a number of shift registers in the emission driving circuit.

12. A display device, comprising an emission driving circuit, wherein the emission driving circuit comprises comprising a first signal line, a second signal line, and a plurality of cascaded shift registers, wherein each shift register of the plurality of cascaded shift registers comprises:
a first node control module electrically connected to an input signal terminal, a first clock signal terminal, and a second clock signal terminal and configured to control a level state of a first node based on an input signal, a first clock signal and a second clock signal;
a second node control module electrically connected to the input signal terminal, the first clock signal terminal, the second clock signal terminal, a high level signal terminal and the first node and configured to control a level state of a second node based on the input signal, the first clock signal, the second clock signal, a high level signal and the level state of the first node, wherein in a phase when the input signal is at a high level and the first clock signal is at a low level, a third node for controlling the level at the second node is provided with a high level, such that in a phase when the input signal is at a high level and the second clock signal is at a low level, the level at the third node is pulled down so as to provide a low level at the second node; and
an output control module electrically connected to the high level signal terminal, a low level signal terminal, the first node and the second node and configured to control an output terminal to output a high level or a low level based on the level state of the first node and the level state of the second node, wherein shift register at each odd-numbered stage has a first clock signal terminal electrically connected to the first signal line, and a second clock signal terminal electrically connected to the second signal line, and wherein shift register at each even-numbered stage has a first clock signal terminal electrically connected to the second signal line, and a second clock signal terminal electrically connected to the first signal line.

13. A driving method of a shift register, applicable in a shift register, wherein the shift register comprises:

a first node control module electrically connected to an input signal terminal, a first clock signal terminal, and a second clock signal terminal and configured to control a level state of a first node based on an input signal, a first clock signal and a second clock signal;

a second node control module electrically connected to the input signal terminal, the first clock signal terminal, the second clock signal terminal, a high level signal terminal and the first node and configured to control a level state of a second node based on the input signal, the first clock signal, the second clock signal, a high level signal and the level state of the first node, wherein in a phase when the input signal is at a high level and the first clock signal is at a low level, a third node for controlling the level at the second node is provided with a high level, such that in a phase when the input signal is at a high level and the second clock signal is at a low level, the level at the third node is pulled down so as to provide a low level at the second node; and an output control module electrically connected to the high level signal terminal, a low level signal terminal, the first node and the second node and configured to control an output terminal to output a high level or a low level based on the level state of the first node and the level state of the second node, wherein the driving method comprises:

in a first phase when the input signal is at the low level, the first clock signal is at the high level and the second clock signal is at the low level, providing low level at the first node, providing high level at the second node and outputting low level at the output terminal based on the low level at the first node;

in a second phase when the input signal is at the high level, the first clock signal is at the low level and the second clock signal is at the high level, maintaining the first node at the low level in the first phase, providing the high level at the second node, outputting the low level at the output terminal and providing the high level at the third node based on the low level at the first node;

in a third phase when the input signal is at the high level, the first clock signal is at the high level and the second clock signal is at the low level, providing the high level at the first node, pulling down the level at the third node to provide the low level at the second node and outputting the high level at the output terminal;

in a fourth phase when the input signal is at the low level, the first clock signal is at the low level and the second clock signal is at the high level, maintaining the first node at the high level in the third phase, maintaining the second node at the low level in the third phase, outputting the high level at the output terminal and providing the high level at the third node; and in a fifth phase when the input signal is at the low level, the first clock signal is at the high level and the second clock signal is at the low level, providing the low level at the first node, providing the high level at the second node and outputting the low level at the output terminal based on the low level of the first node.

14. The driving method of a shift register according to claim 13, wherein the first node control module is electrically connected to the output terminal and configured to:

provide the low level at the first node when the first clock signal is at the low level, the second clock signal is at the high level and the output terminal provides the low level, and maintain the first node at the high level when the first clock signal is at the low level, the second clock signal is at the high level and the output terminal provides the high level.

15. The driving method of a shift register according to claim 14, wherein the first node control module comprises a first transistor, a second transistor and a first capacitor, wherein the first transistor has a control terminal electrically connected to the second clock signal terminal, a first terminal electrically connected to the input signal terminal, and a second terminal electrically connected to the first node, wherein the second transistor has a control terminal electrically connected to the output terminal, a first terminal electrically connected to the first clock signal terminal, and a second terminal electrically connected to a fourth node, and wherein the first capacitor has a first terminal electrically connected to the fourth node and a second terminal electrically connected to the first node.

16. The driving method of a shift register according to claim 15, wherein the first node control module further comprises a third transistor, the third transistor having a control terminal electrically connected to the second node, a first terminal electrically connected to the high level signal terminal and a second terminal electrically connected to the fourth node.

17. The driving method of a shift register according to claim 13, wherein the second node control module comprises a fourth transistor, a fifth transistor, a sixth transistor, a seventh transistor, an eighth transistor, a ninth transistor, a second capacitor and a third capacitor, wherein the fourth transistor has a control terminal electrically connected to the first node, a first terminal electrically connected to the high level signal terminal, and a second terminal electrically connected to the second node, wherein the second capacitor has a first terminal electrically connected to the high level signal terminal and a second terminal electrically connected to the second node, wherein both a control terminal of the fifth transistor and a control terminal of the sixth transistor are electrically connected to the input signal terminal, a first terminal of the fifth transistor is electrically connected to the high level signal terminal, a second terminal of the fifth transistor is electrically connected to a first terminal of the sixth transistor, and a second terminal of the sixth transistor is electrically connected to the third node, wherein both a control terminal of the seventh transistor and a control terminal of the eighth transistor are electrically connected to the first clock signal terminal, a first terminal of the seventh transistor is electrically connected to the high level signal terminal, a second terminal of the seventh transistor is electrically connected to a first terminal of the eighth transistor, and a second terminal of the eighth transistor is electrically connected to the third node, wherein the ninth transistor has a control terminal electrically connected to the third node, a first terminal electrically connected to the second clock signal terminal and a second terminal electrically connected to the second node, and wherein the third capacitor has a first terminal electrically connected to the second clock signal terminal and a second terminal electrically connected to the third node.

18. The driving method of a shift register according to claim 13, wherein the output control module comprises a tenth transistor and an eleventh transistor, wherein the tenth transistor has a control terminal electrically connected to the first node, a first terminal electrically connected to the low level signal terminal and a second terminal electrically connected to the output terminal, and wherein the eleventh transistor has a control terminal electrically connected to the second node, a first terminal electrically connected to the high level signal terminal and a second terminal electrically connected to the output terminal.

* * * * *